No. 838,199. PATENTED DEC. 11, 1906.
L. MILLER.
TRANSPLANTER.
APPLICATION FILED MAR. 15, 1906.
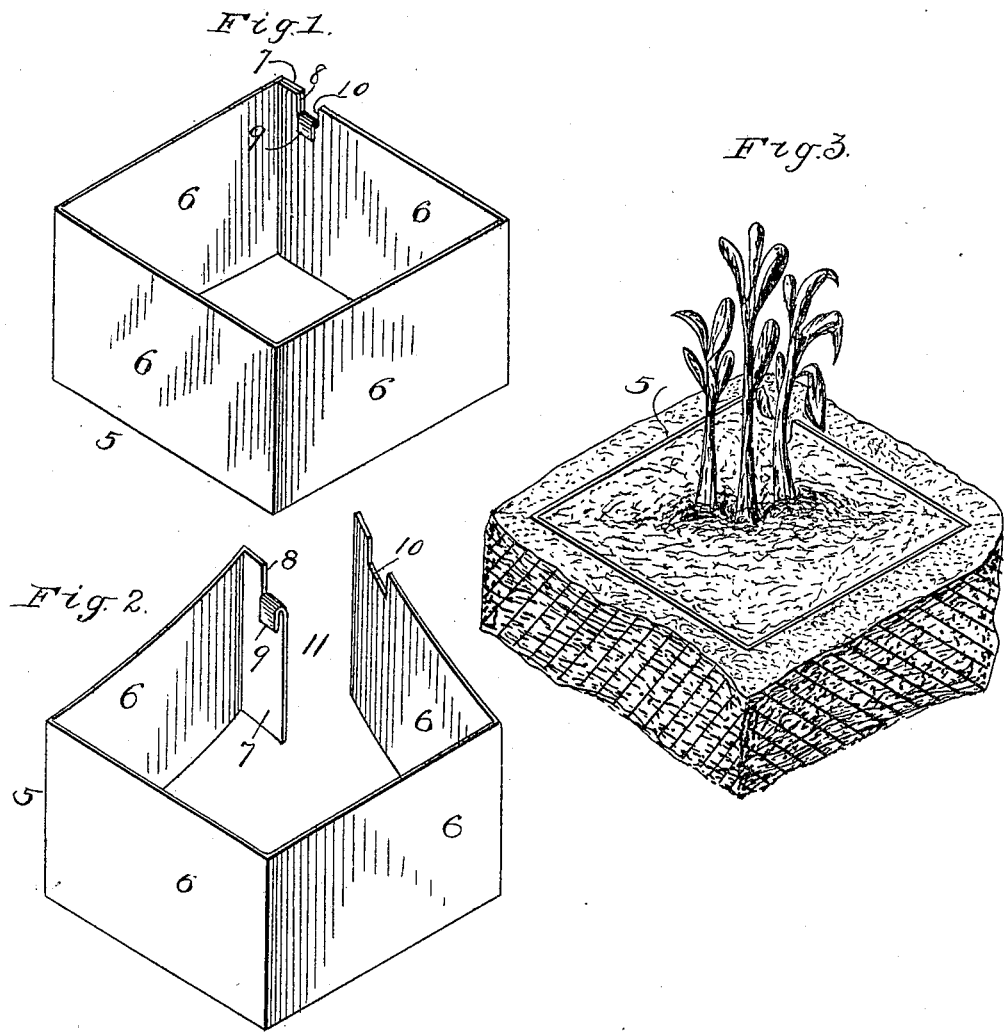
Witnesses
W. Rees Edelen
B. G. Gardner
Inventor
Lewis Miller
By Shepherd & Parker
Attorneys

UNITED STATES PATENT OFFICE.

LEWIS MILLER, OF ELWOOD, INDIANA.

TRANSPLANTER.

No. 838,199.  Specification of Letters Patent.  Patented Dec. 11, 1906.

Application filed March 15, 1906. Serial No. 306,095.

*To all whom it may concern:*

Be it known that I, LEWIS MILLER, a citizen of the United States, residing at Elwood, in the county of Madison and State of Indiana, have invented certain new and useful Improvements in Transplanters, of which the following is a specification.

My invention relates to a device for transplanting plants, and has for its object the provision of a device of this character adapted to remove a portion of the native soil in which the plants have been growing and to remove said soil with the plants to the point at which they are to be planted. By thus removing a portion of the native soil the plants are prevented from wilting or dying, as is often the case when only the plants and their roots are transplanted.

It is a further object of the present invention to provide a device of this character which may be very simply and cheaply made and one which may be placed about the stalks of the plant without passing over the tops of the plants.

Further objects and advantages of the invention will be set forth in the detailed description which now follows.

In the accompanying drawings, Figure 1 is a perspective view of a transplanting device constructed in accordance with the invention and showing the parts locked together to form a rectangular open-bottomed box. Fig. 2 is a perspective view with the corners separated to permit the passage of plant-stalks between the open corners of the box, and Fig. 3 is a perspective view of the device pressed into the ground in such manner as to remove a portion of the native soil together with the plants illustrated in said figure.

Like numerals designate corresponding parts in all of the figures of the drawings.

Referring to the drawings, the numeral 5 designates a metallic band, which is bent to form four sides 6, said sides comprising a rectangular open-bottomed box. A web 7, located at a corner of this box, is cut, as at 8, to provide a downturned hook 9. The web 7 is adapted to overlap the side 6 in such manner that the hook 9 may engage in a cut-away portion 10 of the sides 6 to thereby lock the parts of the box together, as is illustrated in Fig. 1.

The operation of the device is as follows: When the seed is planted, the ground in which said seed is planted is marked off in squares which conform in size to the sides of the box 5. When the plants have attained the proper size and it is desired to remove them from the box in which they have been planted, the box 5 is then opened, as shown in Fig. 2, and the stalks of the plants are passed through the opening 11 formed between web 9 and the adjacent side 6. This obviates the necessity of passing the box over the leaves of the plant, which operation would tend to bruise and injure said leaves. After the box has been thus locked about the stalks of the plants it is pressed into the ground. The gardener then passes a spade beneath the bottom of the box and removes said box and a portion of the native soil surrounding the plant. The boxes containing the plants and the native soil are then placed upon suitable transporting devices and are carried to the place at which it is desired to set out the plants. The boxes are then removed one by one and placed in the earth, after which the hook 9 is disconnected and the cut-away portion 10 of the sides 6 are then opened sufficiently to permit it to be withdrawn from the earth without withdrawing the plant or the native soil.

From the foregoing description it will be seen that simple and efficient means are herein provided for accomplishing the objects of the invention. The provision of a square box of this character enables the gardener in planting the seed to accurately plot off the amount of earth which will be removed by each box.

While the elements shown and described are well adapted to serve the purpose for which they are intended, it is to be understood that my invention is not limited to the precise constructions set forth, but includes within its purview such changes as may be made within the scope of the appended claim.

Having described my invention, what I claim is—

A transplanter embodying an integral section of material bent to form a rectangular open-ended structure, the portions of material adjacent the meeting ends thereof overlapping, the inner portion of said material being formed at a point short of its end with a recess extending from the upper edge thereof, the outer overlapping portion having its upper edge sheared to form a tongue adapted to be bent through said recess and to overlie the inner overlapping portion, in effecting a locking engagement of the sections.

In testimony whereof I affix my signature in presence of two witnesses.

LEWIS MILLER.

Witnesses:
G. H. BARNES,
A. H. REICH.